United States Patent
Lee et al.

(10) Patent No.: US 6,858,993 B2
(45) Date of Patent: Feb. 22, 2005

(54) DRIVING MEANS FOR DRIVING LIGHT SOURCES IN VARIOUS ILLUMINATING PATTERN AND LUMINOUS SHOES APPLIED THEREOF

(75) Inventors: Hak-Sung Lee, Seoul (KR); Woo Young Jeong, Seoul (KR)

(73) Assignee: World Innotel Co., Ltd., Seoul (KR)

( * ) Notice: Subject to any disclaimer, the term of this patent is extended or adjusted under 35 U.S.C. 154(b) by 0 days.

(21) Appl. No.: 10/465,570

(22) Filed: Jun. 20, 2003

(65) Prior Publication Data

US 2004/0256999 A1 Dec. 23, 2004

(51) Int. Cl.$^7$ .......................... H05B 37/00; H01L 27/14
(52) U.S. Cl. .................. 315/185 S; 315/200 A; 315/312; 315/323; 362/800; 362/806
(58) Field of Search .................. 315/185 S, 200 A, 315/312, 323, 324, 360, 316, 292, 294, DIG. 4; 362/800, 806, 812, 807, 808

(56) References Cited

U.S. PATENT DOCUMENTS

| | | | | |
|---|---|---|---|---|
| 3,800,133 A | | 3/1974 | Duval | |
| 5,663,614 A | * | 9/1997 | Weng et al. | 315/360 |
| 5,903,103 A | * | 5/1999 | Garner | 315/76 |
| 5,969,479 A | * | 10/1999 | Wong | 315/200 A |
| 6,095,661 A | * | 8/2000 | Lebens et al. | 362/184 |
| 6,495,964 B1 | * | 12/2002 | Muthu et al. | 315/149 |
| 6,603,271 B2 | * | 8/2003 | Noh | 315/185 S |
| 2004/0036424 A1 | * | 2/2004 | Hsieh | 315/291 |

* cited by examiner

*Primary Examiner*—Tuyet Thi Vo
(74) *Attorney, Agent, or Firm*—Shinjyu Global IP Counselors, LLP (57) ABSTRACT

This invention relates to a driver circuit for driving at least one light source to light in various illuminating patterns according to a predetermined switching operation, and luminous shoes having the driver circuit. A driving means for driving at least one light source in various illuminating patterns, includes a power source for energizing the driving means; a switch for applying a power provided by the power source to the driving means by means of being actuated by an outside action; a control unit for controlling an illuminating pattern to illuminate at least one light source; at least one control switch set up outside of the control unit and connected to the control unit for setting a predetermined illuminating pattern to change the fixed illuminating pattern in the control unit.

15 Claims, 9 Drawing Sheets

DRIVING MEANS FOR DRIVING LIGHT SOURCES IN VARIOUS ILLUMINATING PATTERN AND LUMINOUS SHOES APPLIED THEREOF

TECHNICAL FIELD

This invention relates to a means for generating a illuminating pattern, more particularly to a driver circuit for driving at least one light source to light in various illuminating patterns according to a predetermined switching operation as applied to luminous shoes.

The driving means of this invention can be used to set an illuminating pattern, as one pleases, by a simple operation of a switch on the outside of a package of the means. In the prior art, a driver circuit incorporated in luminous products is designed to drive light sources in a fixed illuminating pattern. Thus, it is impossible to change the illuminating pattern when the driver circuit is packaged. So it is necessary for the changing of illuminating patterns to design driver circuits on a case by case basis for driving the light sources to illuminate in a special illuminating pattern. According to the present invention it is possible to design the driver circuit for driving the light sources in various illuminating patterns by a simple switching operation on the outside of the driver circuit without designing special circuits to illuminate individually special illuminating patterns.

Moreover, it is possible to apply the present driving means to the luminous shoes and luminous products.

BACKGROUND OF THE INVENTION

In the prior art, in a driver circuit for driving a light source to light as applied to luminous shoes, illumination is performed by an action such as the walking or running of wearer. Basically, the circuit and the luminous shoes include a light source that is illuminated by the wearer's shoes hitting the ground so that a motion-activated switch of the circuit is closed via a motion activated switch. The motion-activated switches generally used in the prior arts are mercury, lever, pressure, or spring switches, etc. A driver circuit that utilizes a spring switch is disclosed in U.S. Pat. No. 3,800,133 and U.S. Pat. No. 5,903,103.

In U.S. Pat. No. 5,903,103, it is disclosed that power is supplied to light sources in response to a change in the switch from an open position to a closed position to cause the light source to illuminate.

But, in the above prior art, it is impossible to change the illuminating pattern of the driver circuit when the driver circuit is packaged and incorporated in the shoes. So, a drawback in prior art is that the illuminating pattern of the light sources is fixed after the driver circuit has been manufactured.

If one wants to manufacture luminous products having the illuminating pattern that he or she desires, it is necessary to design a special driving means for driving the light sources by the desired illuminating pattern. Thus, increased costs and manufacturing processing delays occur when designing a special driver circuit.

Practically, the driver circuit may be applied to the shoes, headgear, name cards, or bags, etc., and it is unreasonable to apply a limited and fixed illuminating pattern for the various products. Moreover, it may be another problem not to make the illuminating object agree with luminous products by disregarding the individuality of the products, when a fixed and limited illuminating pattern is utilized.

SUMMARY OF THE INVENTION

An object of the present invention is to provide a driver circuit for driving at least one light source in various illumination patterns.

Another object of the present invention is to provide luminous shoes incorporating a driving means for driving the light sources to illuminate in various illuminating patterns.

In order to achieve the above objects, a driving means for driving at least one light source in various illuminating patterns, comprises a power source for energizing the driving means; a switch for applying power provided by the power source to the driving means that is actuated by an outside action; a control unit for controlling illuminating count and sequence to illuminate at least one light source; and at least one control switch set up outside of the control unit and connected to the control unit for setting a predetermined illuminating count and sequence to change a fixed illuminating count and sequence in the control unit.

The control unit of the driving means comprises an edge detector for detecting an edge pulse at the moment that the switch is closed, and generating a trigger signal; an oscillator oscillated to a predetermined frequency, wherein the oscillator is triggered by the edge pulse detected to the edge detector; a clock generator for generating a clock signal through inputting a oscillated signal from the oscillator; a variable counter for counting a predetermined count through inputting the clock signal of the clock generator and the detected signal of the edge detector; and a sequence control unit for decoding a illuminating count and sequence from inputting a counting signal of the variable counter and the clock signal of the clock generator, wherein the variable counter and sequence control unit, set up outside of the control circuit, are built in at least one illuminating count mode and sequence mode, and the setting control of the count mode and sequence mode is controlled by the switching of at least one control switch, which is connected with the variable counter and sequence control unit.

The driving means further comprises a delay means for delaying an illuminating time of at least one light source to illuminate after a predetermined time from when the light source is switched on.

The driving means is designed on a printed circuit board and packaged, and the control switch is set up on the printed circuit board or outside of the package.

In order to achieve the above objects, luminous shoes comprise at least one light source and a driving means for driving an illumination of the light source, wherein the driving means comprises: a power source for energizing the driving means; a switch for applying power provided by the power source to the driving means by means of being actuated by the action of shoes; a control unit comprises a variable counter built in at least one counting mode and a sequence control unit built in at least one sequence mode, wherein the power is applied by the switching of the switch actuated by the action of shoes, the variable counter counts a predetermined counting operation and the sequence control unit decodes the illuminating pattern, and the built-in counting and sequence mode are controlled to be set by at least one control switch, which is set up outside of the driving means and connected with the variable counter and the sequence control unit; a plurality of light sources, which is illuminated by the driving of the control unit, connected with output terminals of the control unit by wires and set up on a visible portion of the shoes.

The luminous shoes also have features wherein the power source, switch, and control unit are designed on a printed circuit board and packaged by shielding into an epoxy resin to protect against outside impact, the control switch is set up on the printed circuit board or outside of the package; and at least one light source connected with the package is incorporated to the predetermined visible portion of the shoes, and illuminated by the wearer walking.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION

Hereinafter a structure and operation of a driver circuit for driving light sources in various illuminating patterns according to the present invention and referring to the drawings are described.

Figure 1:
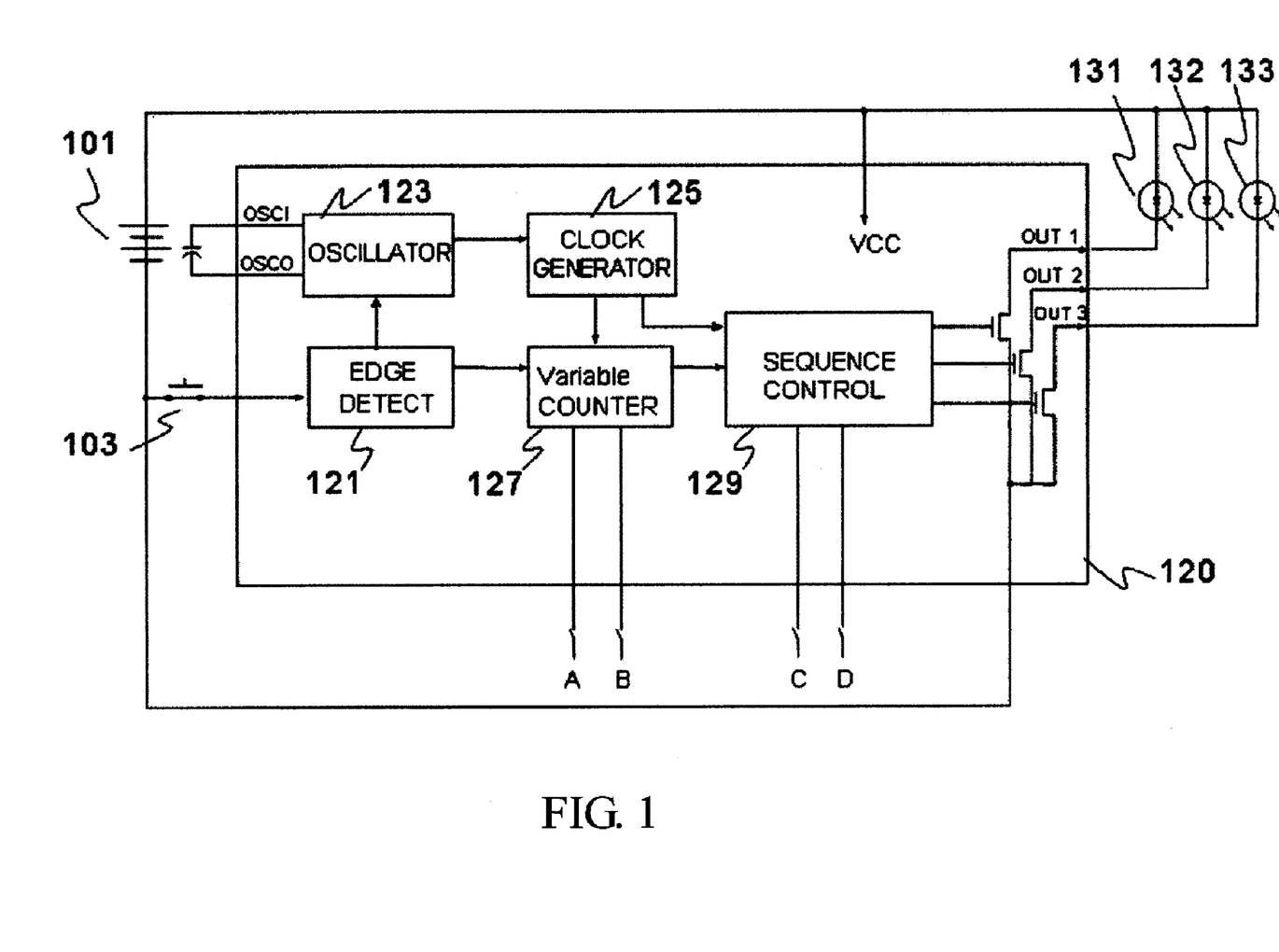
FIG. 1 shows a block diagram of an embodiment of a driver circuit of the present invention.

FIG. 1 shows a block diagram of an embodiment of a driver circuit of the present invention.

Circuit Architecture

Referring to FIG. 1, the driver circuit for driving a light source in various illuminating patterns comprises a switch 103, a power source 101, which is connected to the switch 103 in order to supply power, a variable counter 127, a sequence control unit 129, and light sources 131, 132, and 133.

The power source 101 energizes power to the circuit in order to illuminate the light sources 131, 132, and 133. The switch 103 applies power by means of a motion-activated operation, and the control unit 120 controls a predetermined count and sequence in order to illuminate the light sources in various illuminating patterns.

The variable counter 127 and an oscillator 123 in the control unit 120 are triggered by the operation that closes the switch 103. An edge detector 121 detects an edge pulse at the moment that the switch 103 is closed and triggers the oscillator 123 and the variable counter 127. The oscillator 123 is oscillated to a predetermined frequency by the detected edge pulse. A clock generator 125 generates a clock pulse and provides the clock pulse periodically to the variable counter 127 and the sequence control unit 129. The variable counter 127 counts a predetermined count. A counter setting module is built in the variable counter 127 and has at least one illuminating count mode that may be controlled by the outside of a control switch. The sequence control unit 129 decodes an illuminating sequence and count inputted from the variable counter 127, and controls the illuminating sequence. A sequence control switch is placed outside of the circuit and controlled to set a sequence as desired. A driver drives light sources 131, 132, and 133 to light from the inputted signal of the output in the sequence control unit 129.

Power Source 101

A tiny mercury battery is used for the power source 101 of the present invention as an example. It is desirable to use a battery that is tiny and has a long life cycle because it is impossible to replace the battery that causes electrical discharging when the circuit module is packaged. So, any kind of battery having the above features of being tiny and having a long life cycle may be used in the present invention.

Switch 103

The switch 103 is operated through outside physical motion and applies power from the power source 101 to the driver circuit for illuminating the light sources 131, 132, and 133. A lever switch, mercury switch, pressure switch, and spring switch may be used in present invention as an example. It is desirable to use a spring switch because it is superior to others in the operation of switch-on and switch-off, in restitution and elasticity of a spring, and rarely malfunctions and breakdowns. Moreover, the switching operation is superior to any other in luminous shoes regarding a wearer's walking.

The light sources 131, 132, and 133 are illuminated when the switch is closed in case that the spring switch is utilized in the circuit of the present invention.

A rotary switch, which is operated by the rotation of a wheel when the wheel is attached to the luminous shoes, may be used. Thus, the luminous shoes attached wheels are illuminated by the rotation of a wheel, with the operation that a body of revolution is switch-on on a predetermined point, without walking.

A Light Source 131, 132, and 133

The light sources are comprised with preferable number in accordance with the illuminating object and type of products applied thereof. Generally light emitting diodes (LEDs) are widely used, but the light source may be of a variety of types, e.g., electroluminescent (EL) or incandescent bulbs. It is desirable to use a plurality of LEDs to comprise the light sources of the present invention because the LEDs have advantages, which include good price, high reliability, and stable operation.

Variable Counter 127

Referring to FIG. 1, the variable counter 127 is triggered by the switching signal of the switch 103 and generates an output of an enable signal corresponding to a predetermined counting due to the control of the variable counter 127 or setting outside of the variable counter 127, and then provides the enable signal to the sequence control unit 129.

Generally, a predetermined number and counts the number to increase, that is UP-counter, or decrease, that is DOWN-counter, according to an instruction is stored in the counter. That is, the counter outputs a new value to count by means of increasing or decreasing the stored value when a next input pulse is inputted.

The variable counter 127 of the present invention is installed to a counter setting module that is possible to set in the inside or outside of the variable counter 127, and the mode related to a illuminating count by the setting means in the outside of the circuit may be changed. The counter setting module comprises at least one control switch, which is placed on the outside of circuit, and it is possible to change the illuminating count mode in spite of the shielding of the driver circuit. And, the illuminating count mode can be changed to drive the light sources in various illuminating count modes without fixing the illuminating count of the variable counter itself.

Generally the position of the control switch is on the outside of the circuit package, but it is not limited to that position. The position of the control switch may be on a printed circuit board (PCB), which is designed to set the circuit elements and then the PCB set up the control switch, is packaged and shielded. This case, the object of the present invention may be achieved by the setting of the illuminating pattern with the control of the control switch on the PCB, before the PCB is packaged and shielded.

FIG. 1 shows an embodiment of the architecture in which the set counter is comprised into the variable counter 127 and two external control switches A and B are set up on the outside of circuit. The illuminating cycle is controlled by the switches A and B as shown in the table below. The table below shows an embodiment of the illuminating cycle controlled by the external control switches A and B.

| Switch A | Switch B | Cycle |
| --- | --- | --- |
| 0 | 0 | 3 |
| 0 | 1 | 6 |
| 1 | 0 | 9 |
| 1 | 1 | 12 |

That is, the switches A and B are opened, the illuminating cycle of the light sources 131, 132, and 133 is respectively three. If the switch A is opened and the switch B is closed, the illuminating cycle of the light sources 131, 132, and 133 is respectively six. If the switch A is closed and the switch B is opened, the illuminating cycle is nine. And if the switch A and B are all closed, the illuminating cycle of the light sources 131, 132, and 133 is twelve. But above illuminating cycle of the table is only an embodiment of the present invention and the illuminating cycle of the light sources 131, 132, and 133 is counted by controlling a variety of modes not limited to the above embodiment. The luminous products applied to the driving means of the present invention may be illuminated in various illuminating patterns by the controlling of the variable counter 127 with the setting operation of the count control switches A and B.

The cycles in the table relates to the number of times the light sources are switched in one activation.

A Sequence Control Unit 129

The sequence control unit 129 decodes the illuminating count and sequence in order to light the light sources in a predetermined illuminating sequence when the output of the variable counter 127 is inputted to an enable signal. And, the sequence control unit 129 has built in control logic, which is connected to an external control switch and may control the illuminating sequence by the switching operation of the external control switch.

Generally the setting position of the control switch is on the outside of the circuit package, but not limited to that. The position of the control switch may be on a printed circuit board (PCB), which is designed to set the circuit elements and then the PCB set up the control switch, is packaged and shielded. In this case, the object of the present invention may be achieved by the setting of the illuminating pattern with the control of the control switch on the PCB before the PCB is packaged and shielded.

Figure 2:
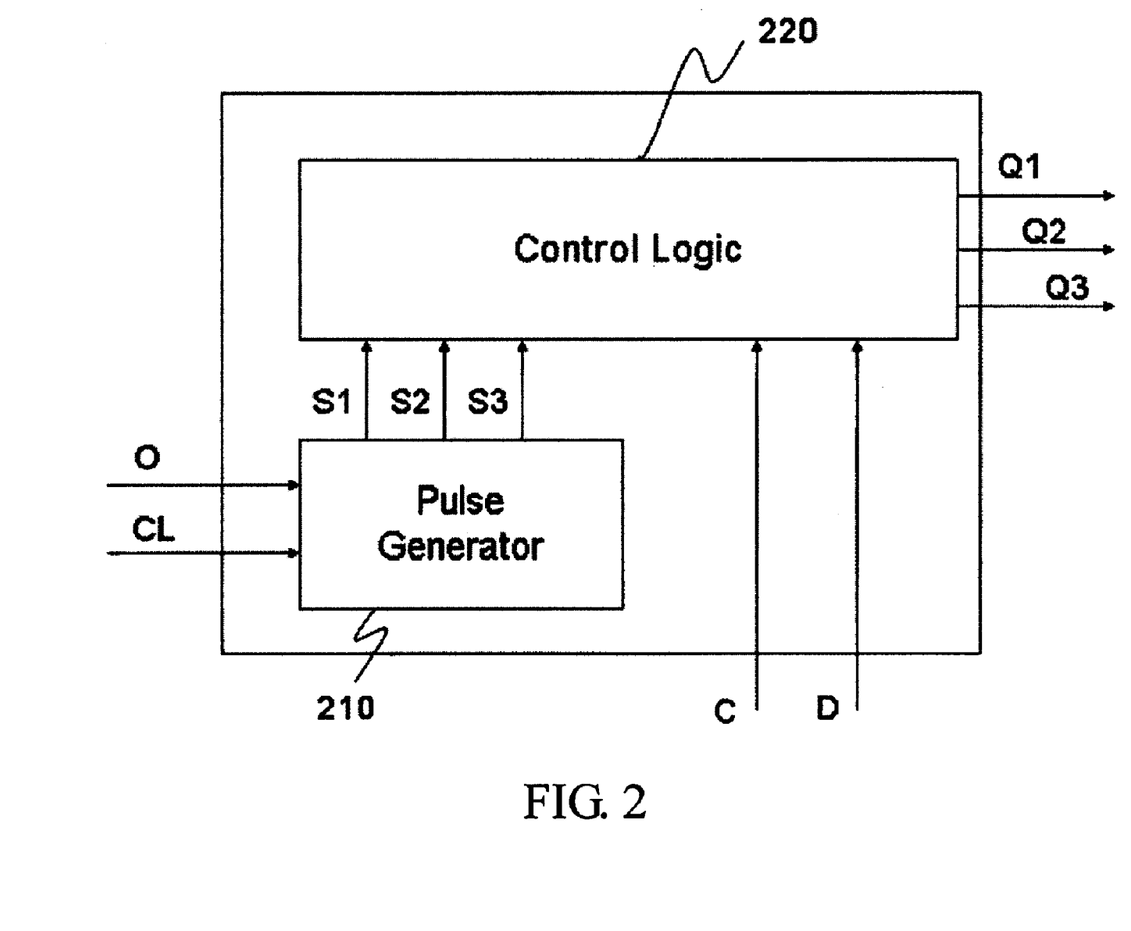
FIG. 2 shows a block diagram of a sequence control unit of a driver circuit of the present invention.

FIG. 2 shows a block diagram of a sequence control unit 129 of the driver circuit in present invention.

The sequence control unit 129 comprises a pulse generator 210 and control logic 220. A clock signal O from the clock generator 125 and an enable signal CL from the variable counter 127 are inputted to the pulse generator 210, and then the pulse generator 210 generates pulse signals S1, S2, and S3. The pulse signals S1, S2, and S3 are inputted to the control logic 220, and then the signals Q1, Q2, and Q3 are outputted from that. The output signals Q1, Q2 and Q3 are applied to the light sources 131, 132, and 133 to be illuminated in a predetermined sequence.

The illuminating sequence decoded from the sequence control unit 129 is also controlled by the desired sequence pattern in external control switches as well as in the sequence control unit 129 itself. So, the sequence control unit 129 connected with at least one of the external control switches placed outside of the driver circuit.

Hereinafter the architecture and operation of the sequence control unit 129 is described.

(1) Pulse Generator 210

The pulse generator 210 generates predetermined pulse signals S1, S2, and S3, wherein the inputted signal O from the clock generator 125 is to be a clock signal and CL form the variable counter 127 is to be an enable signal in the pulse generator 127.

Figure 3:
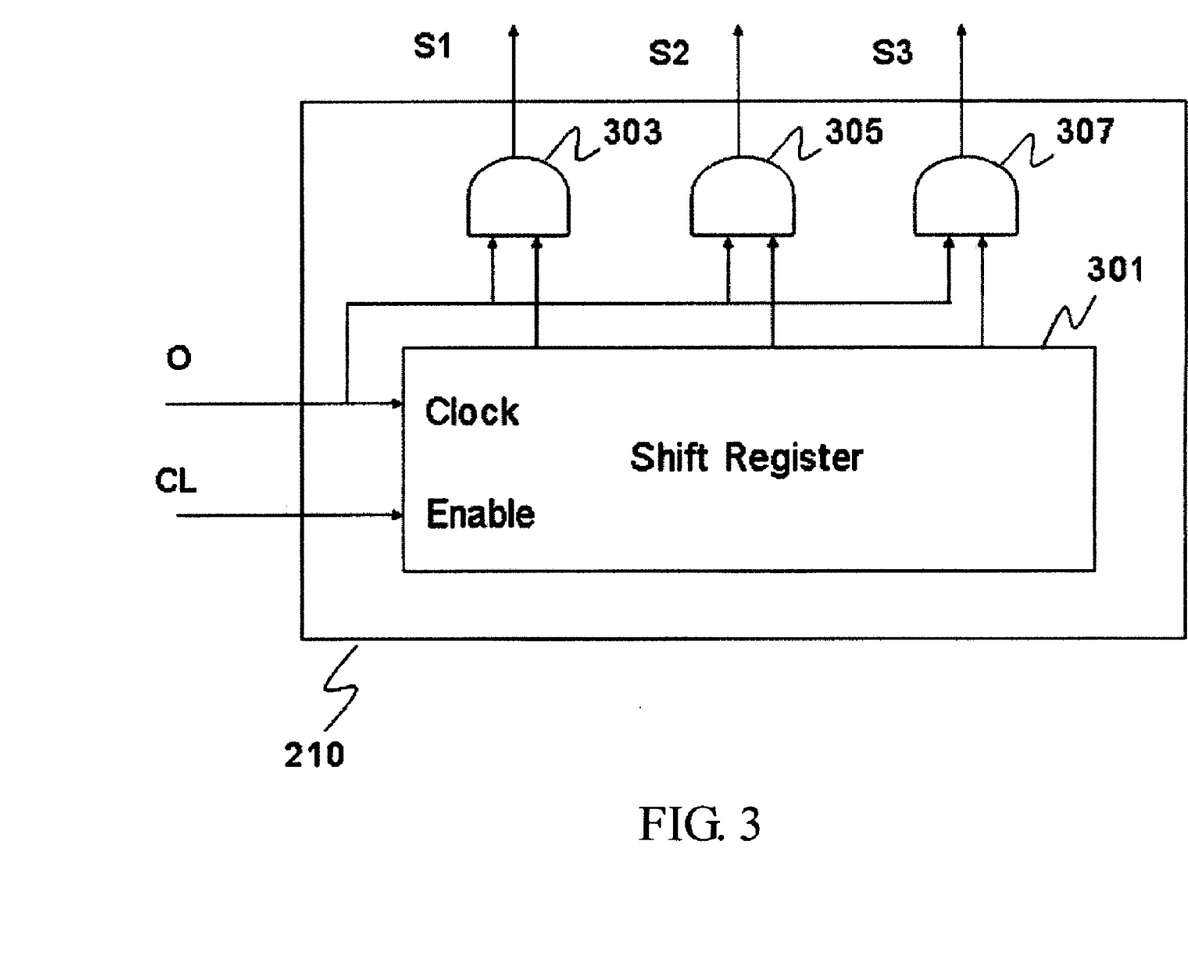
FIG. 3 shows a block diagram of a pulse generator in a sequence control unit of FIG. 2.

FIG. 3 shows a block diagram of the pulse generator 210 in the sequence control unit of FIG. 2. The clock signal O oscillated from the clock generator 125 and the enable signal CL inputted from the variable counter 127 are inputted to a shift register 301, and data shifted in the shift register 301 are inputted with the clock signal O of the clock generator 125 to AND gates 303, 305, and 307, and then output signals of S1, S2, and S3 are outputted.

Figure 4:
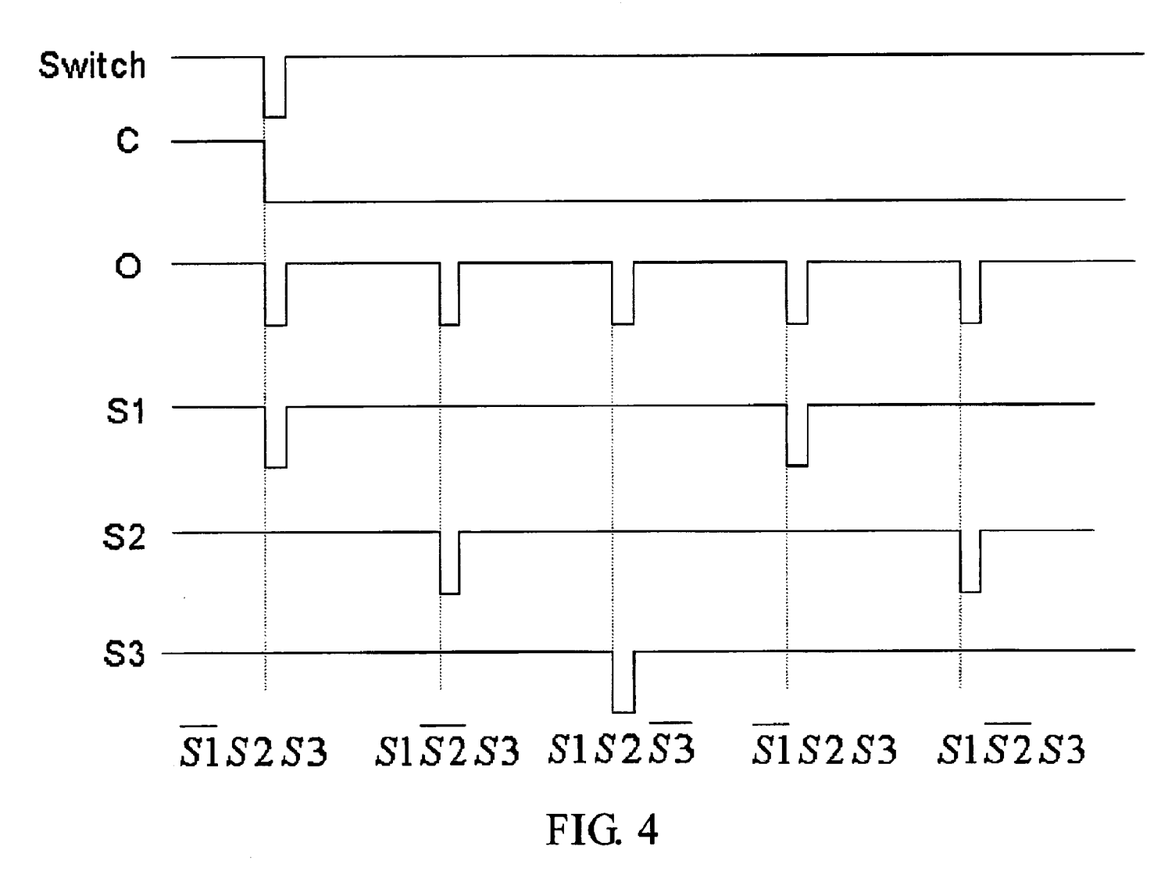
FIG. 4 shows a timing diagram for the driver circuit of FIG. 1.

FIG. 4 shows a timing diagram for the driver circuit of FIG. 1. The pulse showed in FIG. 4 is outputted by the shifting of each output S1, S2, and S3 in the shift register 210, wherein the shifting data are synchronized with the clock pulse of the clock signal O. The timing diagram of FIG. 4 is an embodiment of the present invention, and is not limited by the above embodiment by the modification of design in each element, e.g., a shift register.

(2) Sequence Setting

The control logic 220 is inputted to the output of the pulse generator 210 and a setting value from the sequence setting switch placed outside of the control logic 220, and outputs a final decoding signal.

The sequence setting means that the fixed sequence of the sequence control unit 129 sets to have various sequences by means of the setting of sequence control switch placed outside of the driver circuit. FIG. 1 and FIG. 2 are an embodiment of setting the sequence in the control logic 220 into the sequence control unit 129. The two switches C and D connected with the control logic 220 are placed to the outside of the driver circuit, and through the switching of the switches A and B it is possible to control the sequence showed below as a table of four combinations.

| Switch C | Switch D | Illuminating sequence |
| --- | --- | --- |
| 0 | 0 | Left Right |
| 0 | 1 | Right Left |
| 1 | 0 | Random |
| 1 | 1 | Left Right Left |

That is, the switches C and D are opened, the illuminating sequence of the light sources 131, 132, and 133 is a mode to activate from left to right. If the switch C is opened and the switch D is closed, the illuminating sequence of the light sources 131, 132, and 133 is a mode to activate from right to left. If the switch C is closed and the switch D is opened, the illuminating sequence is a mode to activate at random. And if the switch C and D are all closed, the illuminating sequence of the light sources 131, 132, and 133 is in a mode to activate in rotation. But above illuminating sequence of the table is only an embodiment of the present invention and the illuminating sequence of the light sources 131, 132, and 133 may be set by controlling a variety of modes not limited to the above embodiment. The luminous products applied to the driving means of the present invention may be derived in a various illuminating pattern by the controlling of the sequence to set the sequence control switch C and D.

(3) Control Logic

The control logic 220 outputs Q1, Q2, and Q3 of the sequence control unit 129 to compute by the condition of the external sequence control switch C and D with the outputs of S1, S2 and S3 of the pulse generator 210.

Q1=($\overline{S1}$S2S3$\overline{CD}$+S1$\overline{S2}$S3$\overline{CD}$+S1S2$\overline{S3}$$\overline{CD}$+$\overline{S1}$S2S3CD)

Q2=(S1$\overline{S2}$S3$\overline{CD}$+$\overline{S1}$S2S3$\overline{CD}$+S1$\overline{S2}$S3$\overline{CD}$+S1S2$\overline{S3}$CD)

Q3=(S1S2$\overline{S3}$$\overline{CD}$+S1$\overline{S2}$S3$\overline{CD}$+$\overline{S1}$S2S3$\overline{CD}$+S1$\overline{S2}$S3CD).

The Q1, Q2, and Q3 of the outputs of the sequence control unit 129 are computed to the sequence control unit 129.

Accordingly, the output sequence activated light sources according to the sequence setting value of C and D is appeared below table.

| | |
|---|---|
| C = D = 0 | Q1 Q2 Q3 Q1 Q2 . . . |
| C = 0, D = 1 | Q2 Q1 Q3 Q2 Q1 . . . |
| C = 1, D = 0 | Q3 Q2 Q3 Q1 Q2 . . . (Random) |
| C = D = 1 | Q1 Q3 Q2 Q1 Q3 . . . |

The Q1, Q2, and Q3 of above table are an embodiment of the present invention, and the present invention is not limited to that. The number of outputs Q1, Q2, and Q3 can be more or less than three and the sequence can be set differently to the table.

Figure 5:
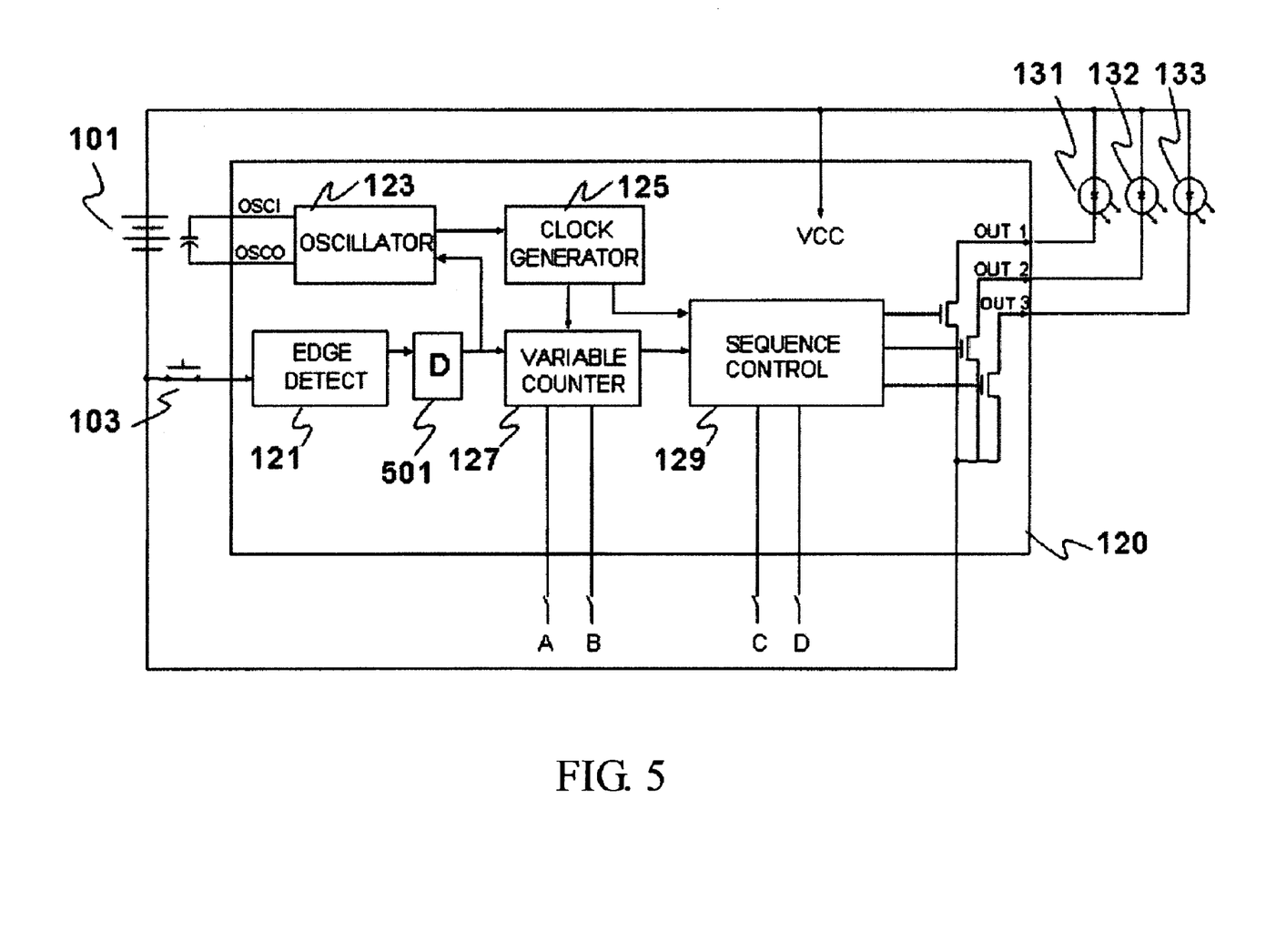
FIG. 5 shows a block diagram of another embodiment.

FIG. 5 shows a block diagram of another embodiment.

The circuit of this embodiment is similar to the circuit of FIG. 1 and only different due to the delay element. Thus, a detailed description of the same elements that have the same numbering of FIG. 1 is omitted. Hereinafter, the delay 501 and the output diagram according to the delay 501 are mainly described.

The delay 501 is the element that allows the response of the output signal not to respond instantly to the changing of the input signal and delays the response a predetermined time. That is, when the wearer of shoes according to the present invention is walking and his or her foot hits the ground, the illuminating of the luminous shoes is not operated immediately in the moments and is delayed a predetermined time. That is, the illumination of the light sources is illuminated some time after the moment his or her foot hits the ground to realize the best illuminating effects.

The delay 501 according to the present invention is inserted between the edge detector 121 and the variable counter 127, and sending delays the oscillated signal to the oscillator and the signal activating the variable counter 127. So the counting operation of the variable counter 127 is delayed a time of $\Delta t$ and the outputs Q1, Q2, and Q3 also delayed a time of $\Delta t$.

Figure 6:
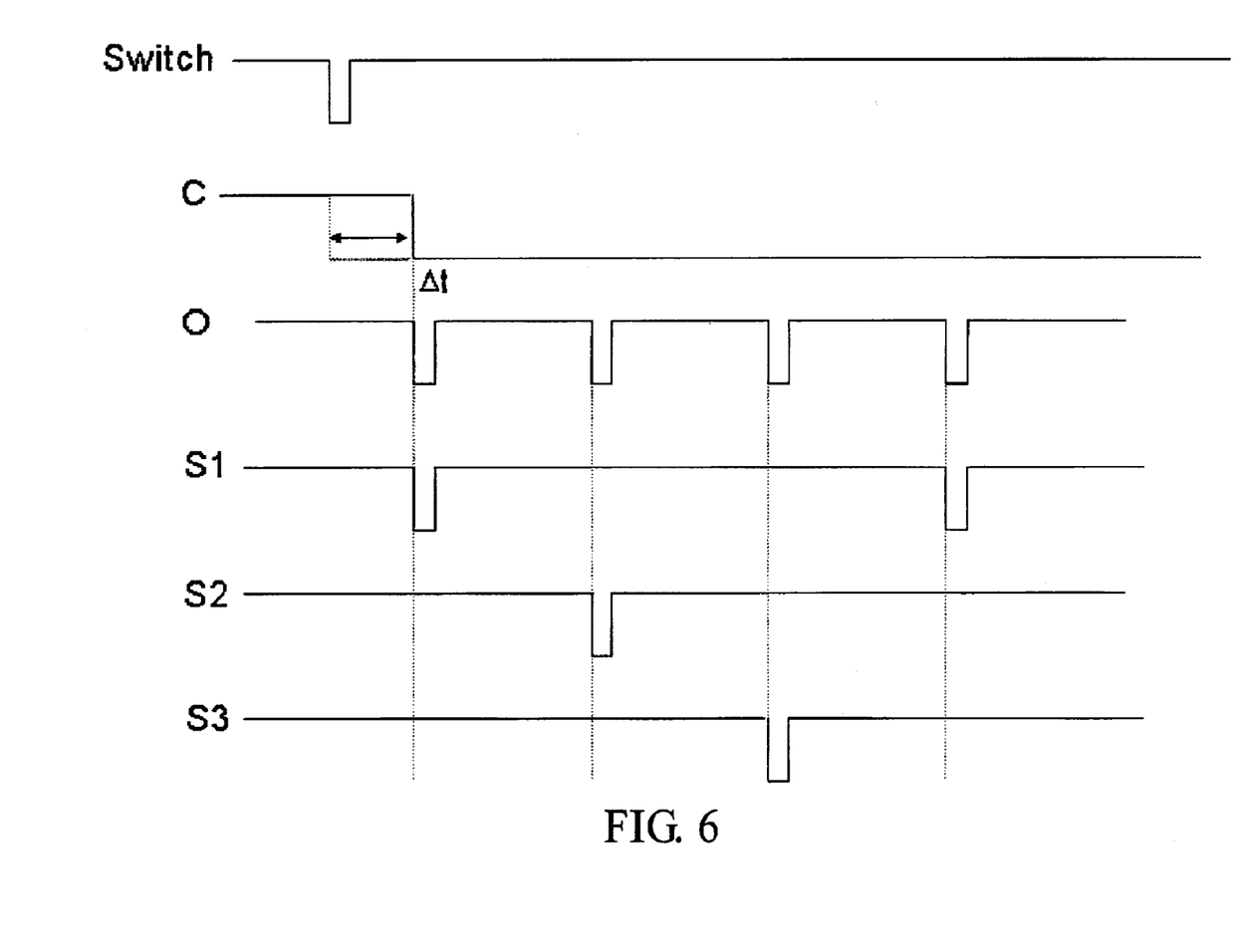
FIG. 6 shows a timing diagram for the driver circuit of FIG. 5.

FIG. 6 shows a timing diagram for the driver circuit of FIG. 5. Referring to FIG. 6, the outputs are delayed by one unit of the clock when compared to the timing of FIG. 4 due to the delay 501. That is, the delay is accomplished by the delaying of the clock signal by a time of $\Delta t$ due by the delaying of oscillation of the oscillator by the time of $\Delta t$.

And the counting signal of the variable counter 127 is also delayed by the time of $\Delta t$. Accordingly the total outputs of Q1, Q2 and Q3 are also delayed by the time of $\Delta t$.

Figure 7:
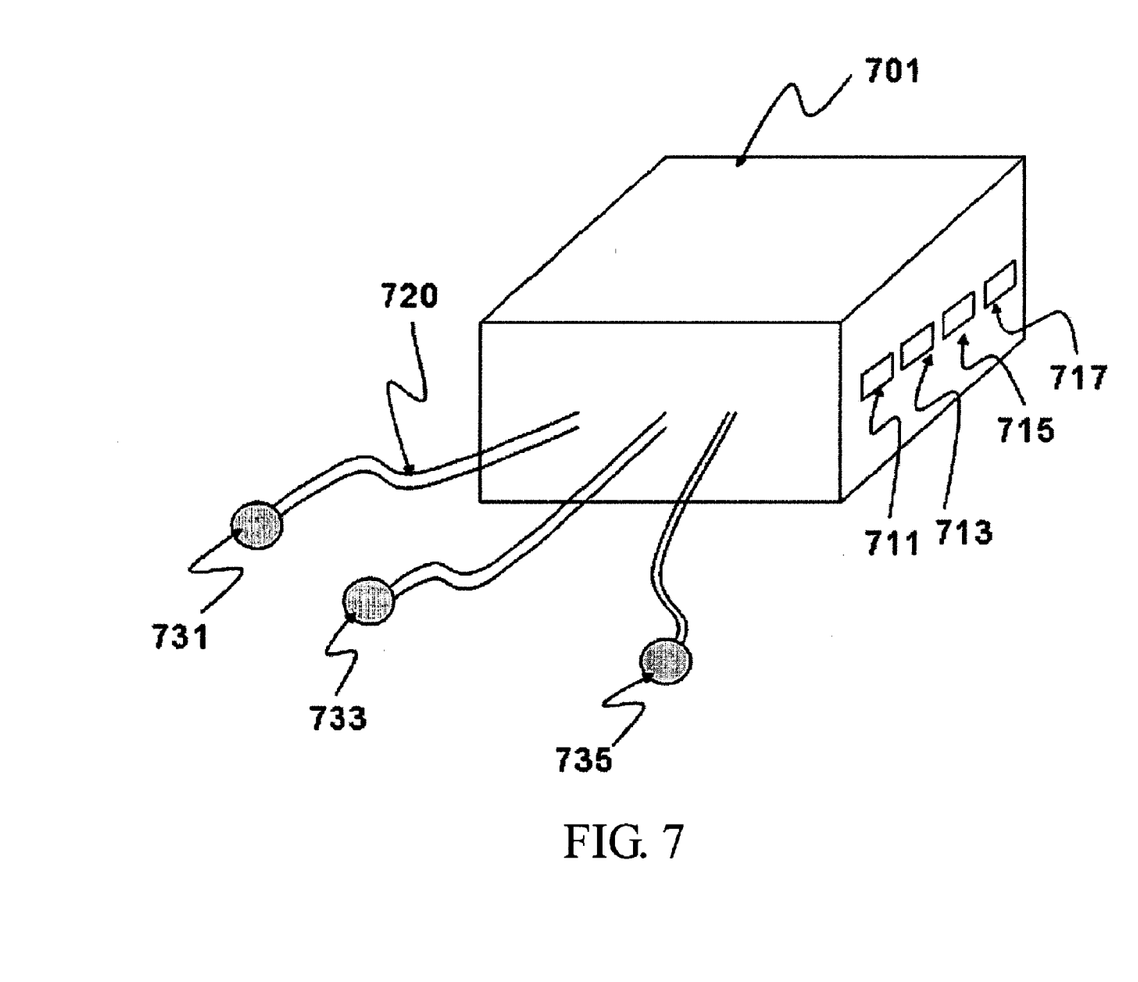
FIG. 7 shows an embodiment of a schematic diagram for the driving means packaged and shielding according to the present invention.

FIG. 7 shows an embodiment of schematic diagram for the driving means packaged and shielded according to the present invention.

Referring to FIG. 7, the driver circuit, a switch and the power source are designed to one module (hereinafter called "illuminating driving module 701"). And then the illuminating driving module 701 is constituted to shield in isolation body, e.g. epoxy, to protect against an external impact.

The illuminating driving module 701 is connected to a plurality of light sources 731, 733, and 735 through the wires 720, and set up control switches A, B, C, and D, which control the illuminating count of the variable counter 127 and illuminating sequence of the sequence control unit 129. But the setting position of the control switches A, B, C, and D are not limited to FIG. 7, and may be set up on the printed circuit board (PCB) within the package. This case, the object of the present invention may be accomplished by setting the illuminating pattern with the control of the control switch on the PCB before the PCB is packaged and shielded. Also the numbers of the control switches are not limited to those shown in FIG. 7.

The illuminating driving module 701 comprises a power source, a switch, a control unit and control switches 711, 713, 715, and 717. The wire 720 that connects the illuminating driving module 701 with the light sources 731, 733 and 735 is constituted by material that is easy to fabricate inserting the luminous products and has a predetermined length.

Additionally, an isolating material, e.g. a paper, is inserted between the power source and the switch in order to prevent the discharge of the power source before a marketing route. The isolating material can be removed outside of the package in ease, and then the circuit can be operated in normal operation of this present invention.

Figure 8:
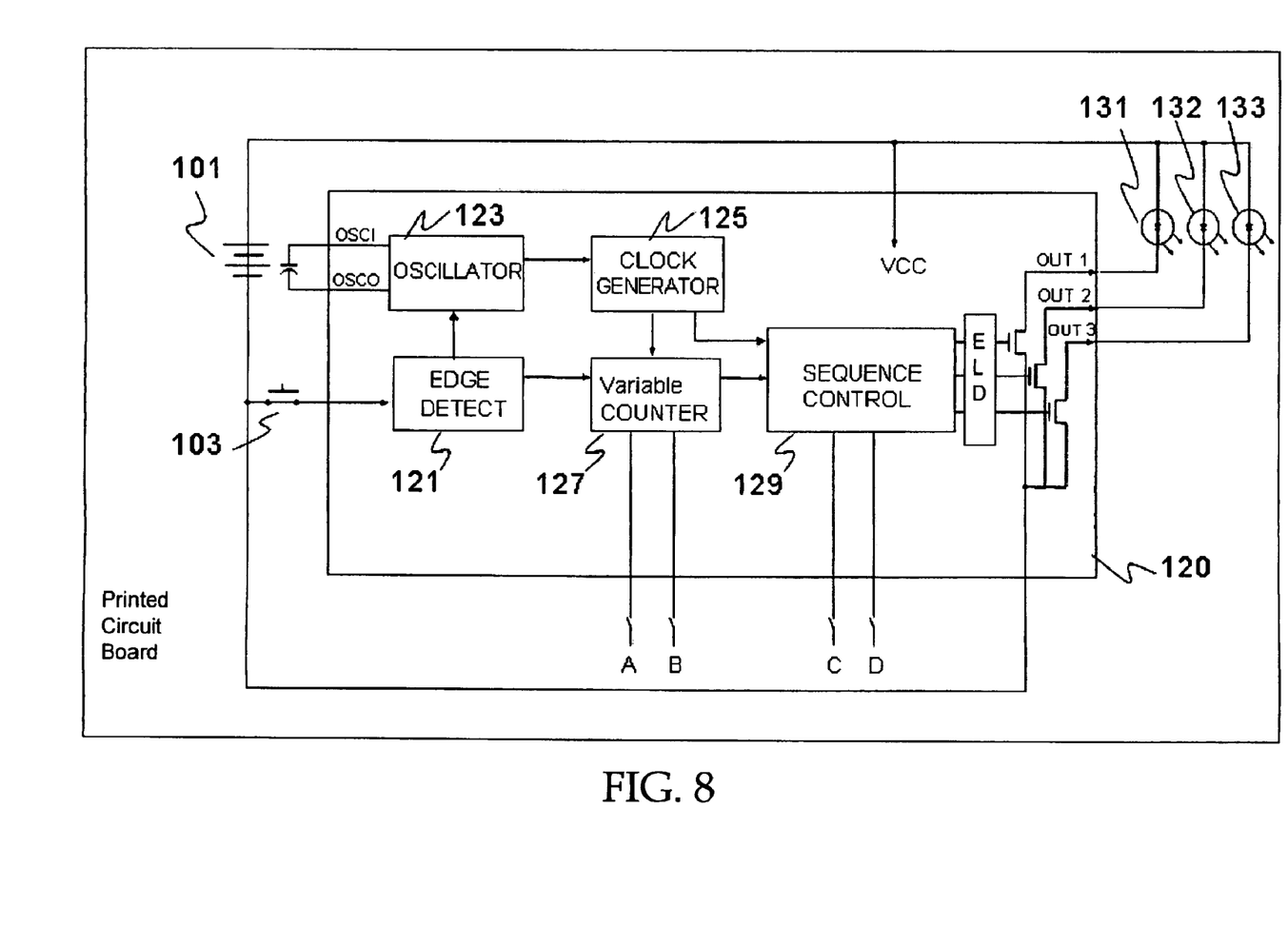
FIG. 8 shows a block diagram of a driver circuit having an electroluminescence driver on a printed circuit board.
Figure 9:
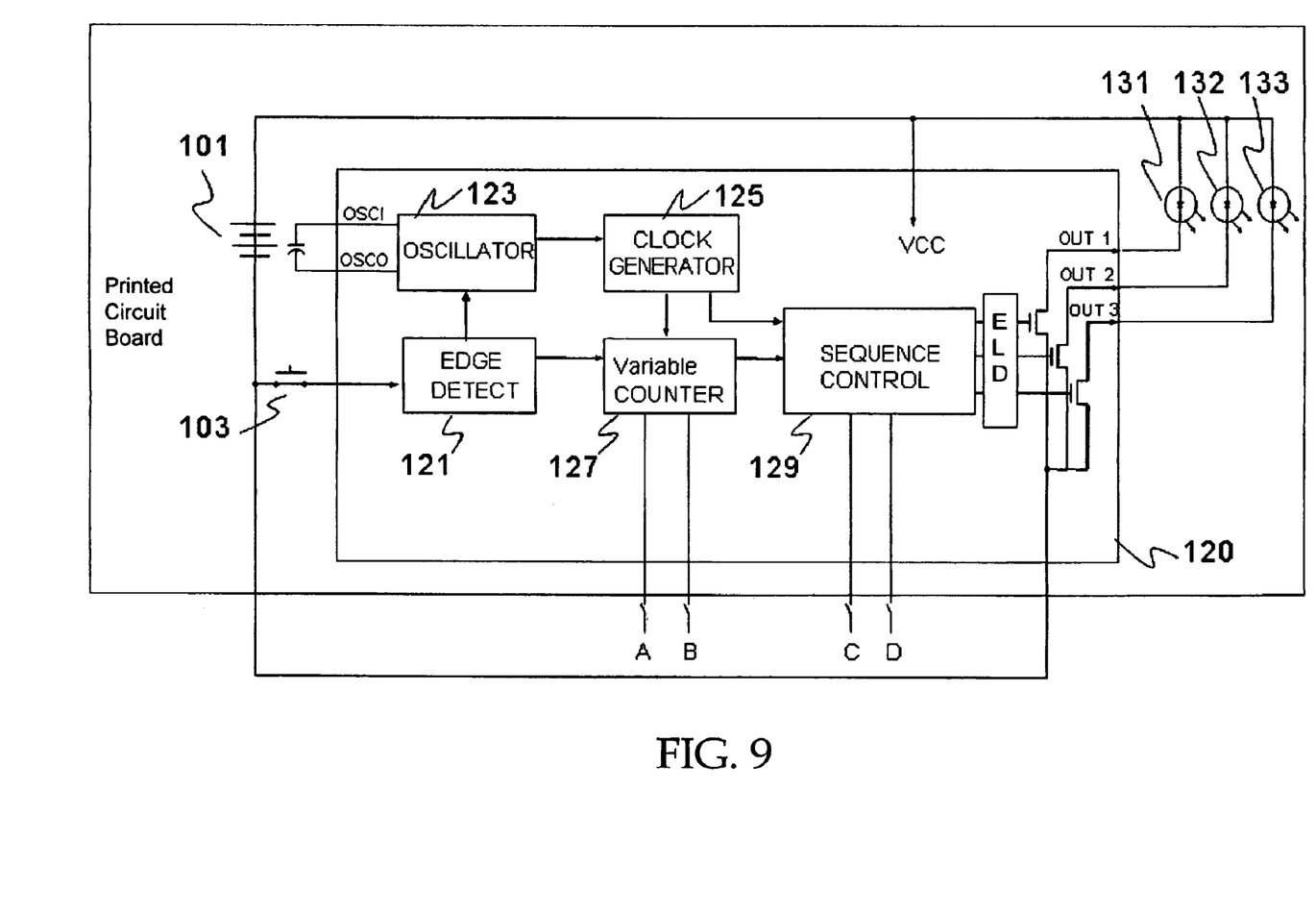
FIG. 9 shows a block diagram of block diagram of a driver circuit having control switch arranged outside a printed circuit board.

The FIG. 7 is an embodiment of the present invention and the present invention is not limited by FIG. 7. That is, the numbers of the light sources and the control switches are not limited to those shown in FIG. 7, and also the setting position of the control switches may be placed inside or outside of the package, as shown in FIGS. 8 and 9. It may be constituted by more than the number of control switches showed FIG. 7 so as to drive the light sources in various illuminating patterns. And it is desirable to comprise a switch that controls the selecting among the light sources to be activated. Further, as shown in FIGS. 8 and 9, the light sources 131, 132, and 133 can be electroluminescent, and the control unit 120 can have an electroluminescence driver for processing the decoded signal applied to the light sources 131, 132, and 133. Additionally, the illuminating time may be controlled by comprising another switch that sets the illuminating time of the light sources. That is, the illuminating time may be applied according to the different type of luminous products. Luminous shoes may be configured relatively to have a long illuminating time. Luminous headgear and a luminous name cards may be configured relatively to have a long illuminating time, as an example. This may be accomplished by the control of the oscillating frequency.

For mass production, the illuminating driving module 701 may be designed as an ASIC, as an example. The manufacturing process of the driving module 701 is that, each element is designed to a printed circuit board and molded to isolation material, e.g. an epoxy. The module manufactured by the process is inserted to the luminous products, e.g.

shoes, headgear, or bag, with the connection of the light sources, and incorporated to a proper position in the luminous products.

INDUSTRIAL APPLICABILITY

According to the present invention, it is possible to set an illuminating pattern, as one pleases, by the simple operating of switching on the outside of a package of the driver circuit and design the driver circuit for generating various illuminating patterns by an operation using simple switching on the outside of the circuit without designing separate circuits that generate separate illuminating patterns. Thus, the cost reductions and mass production in manufacturing the driving module for driving a light source in various illuminating pattern can be accomplished according to the present invention.

What is claimed is:

1. A driver circuit comprising:
    a driving means for driving a plurality of light sources to illuminate in one of a plurality of patterns, said plurality of patterns determining a number of said plurality of light sources to illuminate and sequential order in which said plurality of light sources illuminate;
    a power source for energizing the driving means;
    a switch for applying a power provided by said power source to said driving means, said switch being actuated by an outside action;
    a control unit for controlling illuminating count and sequence to illuminate the at least one light source; and
    at least one control switch being arranged outside of said control unit and connected to said control unit for setting a predetermined illuminating count and sequence to change a fixed illuminating count and sequence in said control unit to select one of said plurality of patterns.

2. The driver circuit driving according to claim 1, wherein said control unit comprises,
    an edge detector for detecting an edge pulse at the moment said switch is closed, and for generating a trigger signal,
    an oscillator for oscillating to a predetermined frequency, said oscillator being triggered by said edge pulse detected by said edge detector,
    a clock generator for generating a clock signal by inputting an oscillated signal from said oscillator,
    a variable counter for counting a predetermined count by inputting said clock signal of said clock generator and said detected signal of said edge detector, and
    a sequence control unit for decoding an illuminating count and sequence from an inputted counting signal of said variable counter and said clock signal of said clock generator,
    said variable counter and sequence control unit, being arranged outside of said control circuit, being built in at least one illuminating count mode and sequence mode, and setting control of said count mode and sequence mode being controlled by switching of said at least one control switch being connected with said variable counter and sequence control unit.

3. The driver circuit according to claim 1, further comprising a delay means for delaying an illuminating time of the at least one light source to illuminate after a predetermined time after said switch for applying power has been actuated.

4. The driver circuit according to claim 1, wherein the light source is a light emitting diode.

5. The driver circuit according to claim 1, wherein the light source is electroluminescent, and said control unit further comprises an electroluminescence driver for processing the decoded signal applied to said light source.

6. The driver circuit according to claim 1, wherein said driving means is designed on a printed circuit board, and said control switch is arranged on said printed circuit board.

7. The driver circuit according to claim 1, wherein said driving means is designed on a printed circuit board, and said control switch is arranged outside said printed circuit board.

8. Luminous shoes comprising:
    a plurality of light sources; and
    a driving means for driving illumination of said light source, said driving means comprising
        a power source for energizing said driving means,
        a switch for applying a power provided by said power source to said driving means said switch being actuated by a predetermined motion of said luminous shoes,
        a control unit comprising a variable counter having at least one counting mode and a sequence control unit having at least one sequence mode, power being applied thereto by switching of said switch actuated by a predetermined motion of said luminous shoes, said variable counter being configured to count a predetermined counting operation and said sequence control unit being configured to decode an illuminating pattern of a plurality of illuminating patterns, said plurality of illuminating patterns determining a number of said plurality of light sources to illuminate and sequential order in which said plurality of light sources illuminate, and said counting and sequence modes being controlled to be set by at least one control switch, being arranged outside of said driving means and connected to said variable counter and said sequence control unit to select one of said plurality of illuminating patterns, and
        a said plurality of light sources being illuminated by driving of said control unit in one of said plurality of illuminating patterns, connected with output terminals of said control unit by wires, and arranged on a visible portion of said luminous shoes.

9. The luminous shoes of according to claim 8, wherein said power source, said switch for applying power, and said control unit are designed on a printed circuit board, packaged, or shielded into an epoxy resin to protect against outside impact,
    said control switch is arranged on said printed circuit board or outside of said package, and
    said plurality of light sources is incorporated on a predetermined visible portion of said shoes, and illuminated by walking or running of a wearer.

10. Luminous shoes comprising:
    a plurality of light sources; and
    a driver circuit being configured to drive illumination of said light source, said driver circuit comprising,
        a power source being configured to energize said driver circuit,
        a power switch being configured to apply power provided by said power source to said driver circuit said power switch being actuated by a predetermined motion of said luminous shoes,
        a control unit comprising a variable counter having at least one counting mode and a sequence control unit having at least one sequence mode, power being applied to said control unit during actuation of said power switch by a predetermined motion of said luminous shoes, said variable counter being configured to count a predetermined counting operation and said sequence control unit being configured to decode an illuminating pattern, and said counting and sequence modes being controlled to be set by at least one control switch being arranged outside of said driver circuit and connected to said variable counter and said sequence control unit, and said plurality of light sources being illuminated by driving of said control unit in a plurality of illuminating patterns determining a number of said plurality of light sources to illuminate and sequential order in which said plurality of light sources illuminate, said control switch being configured to select one of said plurality of illuminating patterns, connected with output terminals of said control unit by wires, and arranged on a visible portion of said luminous shoes.

11. The luminous shoes according to claim 10, wherein the light source is a light emitting diode.

12. The luminous shoes according to claim 10, wherein the light source is electroluminescent.

13. The luminous shoes according to claim 10, further comprising a delay to delay an illuminating time of said plurality of light sources to illuminate after a predetermined time after said power switch has been actuated.

14. The luminous shoes according to claim 10, wherein said control unit includes, an edge detector to detect an edge pulse at the moment said power switch is closed, said edge detector is configured to generate a trigger signal, an oscillator configured to oscillate to a predetermined frequency, said oscillator is triggered by said edge pulse detected by said edge detector, a clock generator configured to generate a clock signal by inputting an oscillated signal from said oscillator, a variable counter configured to count a predetermined count by inputting said clock signal of said clock generator and said detected signal of said edge detector, and a sequence control unit configured to decode an illuminating count and sequence from an inputted counting signal of said variable counter and said clock signal of said clock generator, said variable counter and said sequence control unit being arranged outside of said control circuit, being built in at least one illuminating count mode and sequence mode, and setting control of said count mode and sequence mode being controlled by switching of said at least one control switch being connected with said variable counter and sequence control unit.

15. The luminous shoes according to claim 14, further comprising a delay to delay an illuminating time of said plurality of light sources to illuminate after a predetermined time after said power switch has been actuated.

* * * * *

UNITED STATES PATENT AND TRADEMARK OFFICE
CERTIFICATE OF CORRECTION

PATENT NO. : 6,858,993 B2
DATED : February 22, 2005
INVENTOR(S) : Hak-Sung Lee et al.

It is certified that error appears in the above-identified patent and that said Letters Patent is hereby corrected as shown below:

<u>Title page,</u>
Item [73], Assignee, should be -- World Innotek Co., Ltd. --

Signed and Sealed this

Nineteenth Day of July, 2005

JON W. DUDAS
*Director of the United States Patent and Trademark Office*